May 7, 1935.  A. H. OELKERS  2,000,534
ROLLER BEARING AXLE
Filed Jan. 28, 1929
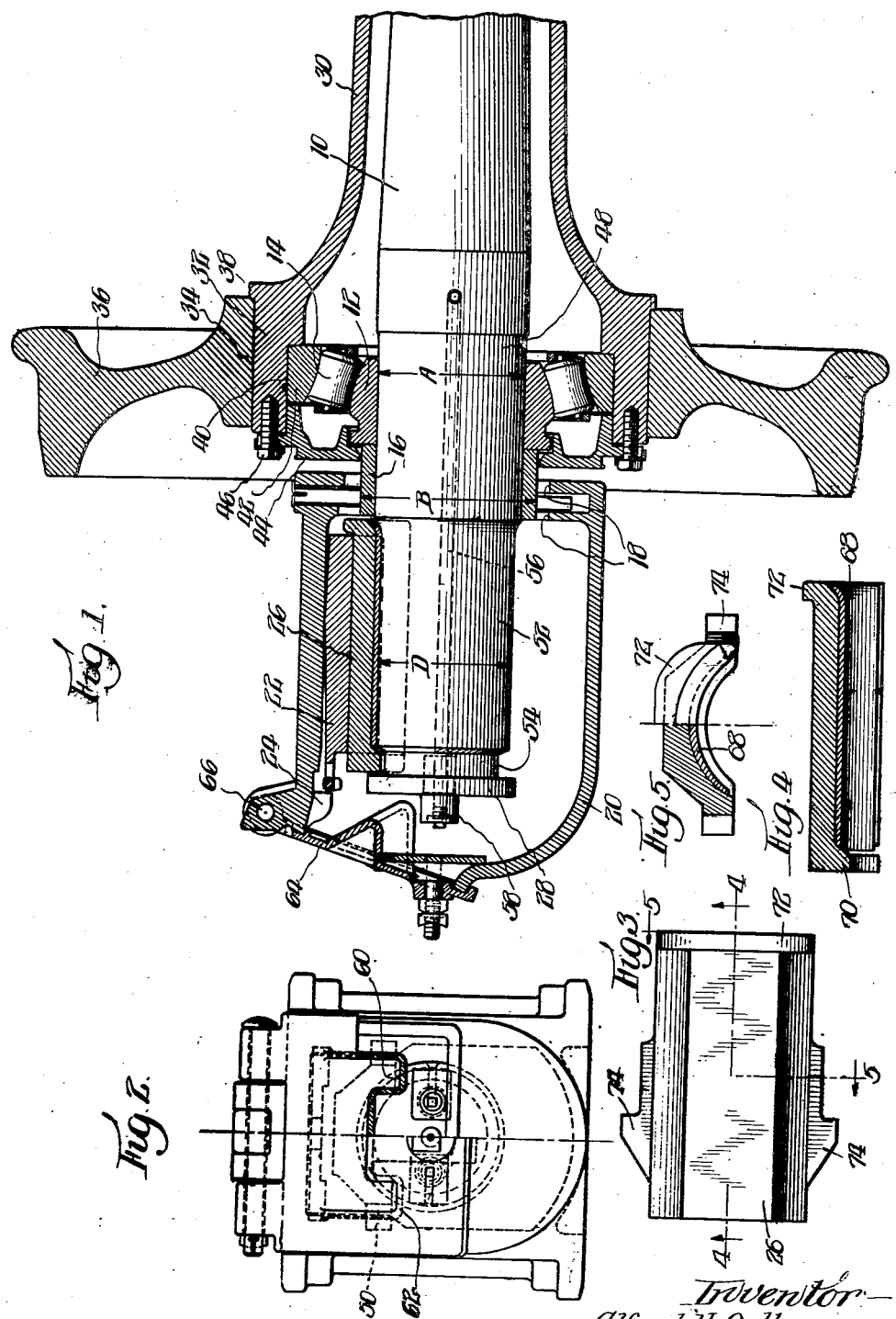
Inventor—
Alfred H. Oelkers,
By Wilkinson, Huxley, Byron & Knight
Attys.

Patented May 7, 1935

2,000,534

UNITED STATES PATENT OFFICE 2,000,534

ROLLER BEARING AXLE

Alfred H. Oelkers, Chicago, Ill., assignor to American Steel Foundries, Chicago, Ill., a corporation of New Jersey Application January 28, 1929, Serial No. 335,647

7 Claims. (Cl. 295—36)

This invention pertains to improvements in roller bearing axles for railway cars.

In the construction of roller bearing axles for railway equipment which are designed as unit assemblies to be interchangeable with the axles mounted on the friction bearings now generally used, it has been found necessary to provide a special construction to obtain the successful mounting of the inner normally stationary axles in the standard journal boxes. In providing journal bearings for the new anti-friction roller bearing axles, it has been found desirable to provide journal bearings of slightly different shape from those usually used in the present axles to thereby adapt the journal bearing to fit only as means for mounting the roller bearing axles within the standard journal boxes and not as means for use with the usual standard friction bearings. Such prevention of interchangeability of the journal bearing is particularly sought because it is economical to make the journal bearing for the roller bearing axle of a much cheaper material than the high-grade brass bearing needed when the axle revolves at this point continuously, especially when it is considered that with the anti-friction bearings there is normally little movement between the journal bearing and its cooperating axle.

It is therefore necessary to provide a clear indication of the use to which the particular journal bearing is to be put for if the two journal bearings were of exactly the same construction, workmen might be mistaken and use the bearing intended for the roller bearing axle as a regular standard friction bearing, but as the material of which it is made would not withstand such service, damage might be done to the construction. When the indication of differences between the journal bearings can be combined with the useful function of said differences, a decidedly advantageous structure is perfected.

It is therefore an object of this invention to provide a journal bearing for an anti-friction wheel and axle assembly which is inexpensive to make and maintain, fulfills all requirements of manufacture and service, and which is of such construction that while it functions perfectly as an anti-friction journal, it preferably cannot be adapted to direct use with the usual friction type of axle.

Another object is to provide a roller bearing wheel and axle assembly of such construction that the parts will not work relative to each other to displace the parts or to damage any of the parts, such as crushing the rollers.

Another object is to provide an anti-friction wheel and axle assembly which is readily assembled and which has parts interlocking with means associated with the journal box to prevent unauthorized relative movement between the parts of the assembly.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a fragmentary sectional elevation of a portion of a wheel and axle assembly associated with a journal box, the same embodying the invention;

Figure 2 is an end elevation, partly in section, of the journal box and associated parts of the assembly embodying the invention;

Figure 3 is a top plan view of the improved journal bearing;

Figure 4 is a longitudinal sectional elevation of the journal bearing illustrated in Figure 3, the same being taken substantially in the plane as indicated by the line 4—4 of Figure 3; and Figure 5 is an end elevation, partly in section, of the journal bearing illustrated in Figure 3, the same being taken substantially in the plane as indicated by the line 5—5 of Figure 3.

Referring first of all more particularly to Figures 1 and 2, it must be kept in mind that there are a number of conditions to be met for a successful roller bearing wheel and axle assembly adapted for use with the present standard journal boxes provided on truck and other vehicle side frames. First of all, it is necessary that the diameter A of the inner relatively stationary axle 10 be large enough to give the required strength to the inner axle, the diameter A being adjacent the inner race rings 12 of the roller bearing assemblies 14. The diameter B, that is, the outer diameter of the collar 16 holding the inner race ring in operative position, must be small enough to go within the opening 18 of the journal box 20 in order to have sufficient clearance in this opening so that by raising or lowering the journal box 20, the wedge 22 can be disengaged from the lug 24 of the journal box which holds it in its position endwise. Diameter D must be large enough to give the required strength to the inner axle along the journal bearing 26. Thus with the diameters A, B and D limited, a comparatively small difference in the diameter of the flange 28 of the inner axle as compared to the diameter D remains, and some provision is needed to form a shoulder by which the axle 10 can be held from moving endwise. It will be noted that a shoulder is provided by the difference in diameters B and D adjacent the shrink collar 16.

The outer hollow axle 30 is provided with an enlarged portion 32 forming a lubricant recess and providing an elongated portion 34 upon which wheels 36 can be shrunk, pressed or otherwise secured, shoulder 38 being provided for limiting the position of said wheels. The enlarged portion 32 is also provided with an inner elongated portion 40 adapted to receive the outer race ring 42 of the roller bearing assembly 14, and a cover plate 44 may be bolted as at 46 or otherwise secured to the enlarged portion 32 of the outer revolving axle to form a closure for the lubricant recess, the cover plate extending adjacent to the securing ring 16 shrunk, pressed or otherwise secured to the portion of the axle 48 having the diameter A.

A portion of the ring 16 extending within the opening 18 of the journal box 20, said journal box having the usual side lugs 50 and the upper wedge engaging lug 24. The inner stationary axle 10 extends within the journal box 20 and is provided with a journal bearing engaging portion 52 having diameter D, and is also provided with a groove 54 adjacent the end thereof, the end being formed with the flange 28. The inner axle may be of the hollow lubricant containing type, such as illustrated in copending application Serial No. 335,845, filed April 7, 1928, by Alfred H. Oelkers for Wheel and axle assembly or it may be of the solid type provided with a conduit 56 extending to a point within the lubricant recess formed in the outer axle 30 from the end of said axle, the end of said axle also being provided with a lug 58 adapted to revolve to contact lugs 60 and 62 formed in the journal box lid 64, said lid being described in copending application Serial No. 211,385, filed Aug. 8, 1927, and hinged as at 66 to the journal box. The lug 58 may also be used to rotate the inner axle to correctly position the channel 56 for lubricating the bearings.

The journal box bearing 26 is of arcuate shape to correspond to the portion 52 of diameter D of the inner axle, said bearing being lined as at 68 and provided with a depending flange 70 adapted to fit in the groove 54. The journal bearing is also provided with an upstanding flange 72 at the opposite end thereof adapted to contact with the end of the wedge 22, and said journal bearing is provided with side lugs 74 adapted to contact with the usual inner lugs 50 provided on the journal box. Flange 72 may also serve to prevent movement of the collar 16 whereby the inner race 12 is prevented from being displaced.

With this arrangement, the stationary axle 10 is held in the journal box by the journal bearing as it will be seen that the abutment between the lug 70 and the flange 28 prevents movement of the inner axle by virtue of the contact between the lugs 74 and 50. A movement in the opposite direction of the inner axle is prevented by the journal bearing at the other end of the axle and also by contact between the upstanding flange 72 of the journal bearing and the wedge 22 as the wedge 22 is adapted to contact depending lug 24 of the journal box. The roller bearing wheel and axle assembly of course functions the same as the anti-friction roller bearing assembly illustrated in application Serial No. 182,734, filed April 11, 1927, by Alfred H. Oelkers, for Anti-friction wheel and axle construction, and by providing a journal bearing of the character described, it will be seen that no interchangeability is permitted between this journal bearing and the usual friction journal bearings so that an economical journal bearing can be made as there is little wear between the inner stationary axle and the journal bearing of the anti-friction assemblies.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a wheel and axle assembly, the combination of a journal box, a wheeled rotatable axle, an inner axle extending through said rotatable axle and into said journal box, bearings between said axles, said bearings being constructed to operatively accommodate axle deflection, an abutment provided on said inner axle, abutments provided on said journal box, and means disposed between said abutments to limit movement of translation of one of said axles.

2. In a wheel and axle assembly, the combination of a journal box, a wheeled rotatable axle, an inner axle extending through said rotatable axle and into said journal box, bearings between said axles, said bearings being constructed to operatively accommodate axle deflection, abutments provided on said journal box, a wedge for contacting an abutment on said journal box, a journal bearing provided between said wedge and said inner axle and provided with abutments cooperating with the abutment formed on said inner axle and with said wedge, and abutments on said journal box whereby relative movement of translation is prevented between one of said axles and said journal box.

3. In a wheel and axle assembly, the combination of an outer wheeled rotatable axle, a journal box, an inner normally stationary axle extending through said outer axle and having a portion extending into said journal box, anti-friction bearings disposed between said axles, a collar disposed on said inner axle for maintaining the anti-friction bearings in operative position, and means provided between the end of the inner axle and said collar and between the inner axle and the journal box to limit relative movement of translation between said inner axle and said journal box.

4. In a wheel and axle assembly, the combination of a journal box, a wheeled rotatable axle, an inner axle extending through said rotatable axle and into said journal box, bearings between said axles, said bearings being constructed to operatively accommodate axle deflection, an abutment provided on said inner axle, abutments provided on said journal box, and means disposed between and having cooperative engagement with said abutments to limit movement of translation between one of said axles and said journal box.

5. In a wheel and axle assembly, the combination of a journal box, a wheel, an axle cooperating with said wheel and extending into said journal box, abutments on said axle, one of said abutments being adjacent a channel formed in said axle, an abutment provided on said journal box, and means disposed between and having cooperative engagement with said abutments and having a portion extending into said channel to prevent movement of translation between said axle and journal box.

6. In combination with a housing, a shaft extending into said housing and having a journal portion disposed in said housing, a pair of abutments on said shaft disposed in said housing, a channel formed in said shaft adjacent one of said abutments, and wear means disposed on said journal portion and having a pair of abutments cooperating with said first named abutments, one of said last named abutments extending into said channel.

7. In combination with a housing, a shaft extending into said housing and having a journal portion disposed in said housing, a pair of abutments on said shaft disposed in said housing, a channel formed in said shaft adjacent one of said abutments, wear means disposed on said journal portion and having a pair of abutments cooperating with said first named abutments, one of said last named abutments extending into said channel, and cooperating abutting members provided on said housing and wear means whereby relative movement between said housing and shaft is prevented in a direction axially of said shaft.

ALFRED H. OELKERS.